United States Patent [19]

Janssens

[11] 4,409,060

[45] Oct. 11, 1983

[54] EDGE BANDING MEANS

[75] Inventor: Werner J. Janssens, Auckland, New Zealand

[73] Assignee: W. J. Janssens Industries (N.Z.) Limited, Auckland, New Zealand

[21] Appl. No.: 290,922

[22] Filed: Aug. 7, 1981

[30] Foreign Application Priority Data

Aug. 11, 1980 [NZ] New Zealand .................... 194631

[51] Int. Cl.³ ............................................. B32B 31/10
[52] U.S. Cl. ................................... 156/497; 156/499; 156/510; 156/522
[58] Field of Search ............... 156/497, 499, 522, 250, 156/510; 144/309 W, 315 R, 317

[56] References Cited

U.S. PATENT DOCUMENTS

| 3,753,832 | 8/1973 | Veneziale | 156/499 |
| 4,067,762 | 11/1978 | Rhoads | 156/499 |
| 4,222,812 | 9/1980 | Duewel | 156/497 |

FOREIGN PATENT DOCUMENTS 481393 12/1975 U.S.S.R. .

Primary Examiner—Caleb Weston
Attorney, Agent, or Firm—Cantor and Lessler

[57] ABSTRACT

This invention relates to a method and apparatus for adhering bands or tapes to surfaces, and in particular for applying a band of veneer material to the edge of a board.

11 Claims, 3 Drawing Figures

EDGE BANDING MEANS

BACKGROUND OF THE INVENTION

When a veneer is applied to a board, such as particle board, to improve its appearance, a narrow band of veneer coated on one surface with a heat sensitive adhesive is normally also applied around the edges of the board so that none of the substrate board itself is visible. Various devices have been proposed in the past for quickly and effectively applying such bands or tapes, but these have had difficulties as a result of the need to avoid heating the application roller.

The requirement is that a band or tape of veneer material, coated with heat sensitive adhesive on one surface and being of the same width as the edge of a board to which the tape is to be applied, be fed past a hot air duct. The duct blows hot air onto the coated surface of the tape to heat the adhesive material. The tape is then passed between an application roller and the board, enabling the roller to press the tape onto the edge of the board. When the end of the board is reached, the tape is severed, and when the severed end of the tape has passed the hot air blower the hot air tends to blow directly onto the application roller and heat it, thus producing a tendency for the tape to adhere to the roller. This has generally been avoided in the past by redirecting the flow of hot gas so that it is directed away from the application roller. However, this has involved movement of the hot air duct, and this movement tends to shorten the life of the heating element within the duct. The construction is also rather complicated.

It is an object of the present invention to go some way towards alleviating the above difficulties or to provide the public with a useful choice.

SUMMARY OF THE INVENTION

In a first aspect the present invention consists in an edge banding machine comprising a heating means for blowing heated gas onto one surface of a tape, to heat it, the heating means having a fixed nozzle through which the gas can be directed onto the tape, a feeding means for feeding a tape past the heating means, an applying means downstream of the heating means for pressing heated tape onto a surface to which it is to be adhered, and a severing means upstream of the heating means for cutting the tape to the length of the surface to which it is to be adhered, the construction and arrangement being such that, in use, when tape is being fed past the heating means the gas is directed through the nozzle directly onto the tape, and while no tape is being fed past the heating means the heated gas issuing through the nozzle is directed onto an empty space and not directly onto the applying means.

In a second aspect the present invention consists in an edge banding machine comprising a heating means for blowing heated gas onto one surface of a tape, to heat it, a feeding means for feeding a tape past the heating means, an applying means downstream of the heating means for pressing the heated tape onto a surface to which it is to be adhered, and a severing means upstream of the heating means for cutting the tape to the length of the surface to which it is to be adhered, each of said heating means, feeding means and applying means being mounted on at least one base plate.

In a third aspect the present invention consists in an edge banding machine comprising a heating means for blowing heated gas onto one surface of a tape, to heat it, a feeding means for feeding the tape past the heating means, an applying means downstream of the heating means for pressing heated tape onto a board to which it is to be adhered, a severing means upstream of the heating means for cutting the tape to the length of the surface to which it is to be adhered, and a supporting means upon which a guiding means for guiding the tape past the heating means can be removably supported.

In a fourth aspect the present invention consists in a method of applying a band to a substrate surface, the method comprising the steps of feeding the band past a fixed nozzle and directing hot gas through the nozzle to heat the band, passing the band around an applying means with the heated surface of the band facing outwardly, using the applying means to press the heated surface of the band against the substrate surface, severing the band upstream of the nozzle and, when the severed end of the band has passed the nozzle, allowing the hot gas from the nozzle to continue to blow into an empty space, so that it does not impinge against the applying means.

The above gives a broad outline of the present invention, a preferred embodiment of which will now be described by way of example and with reference to the accompanying drawings in which.

Figure 1:
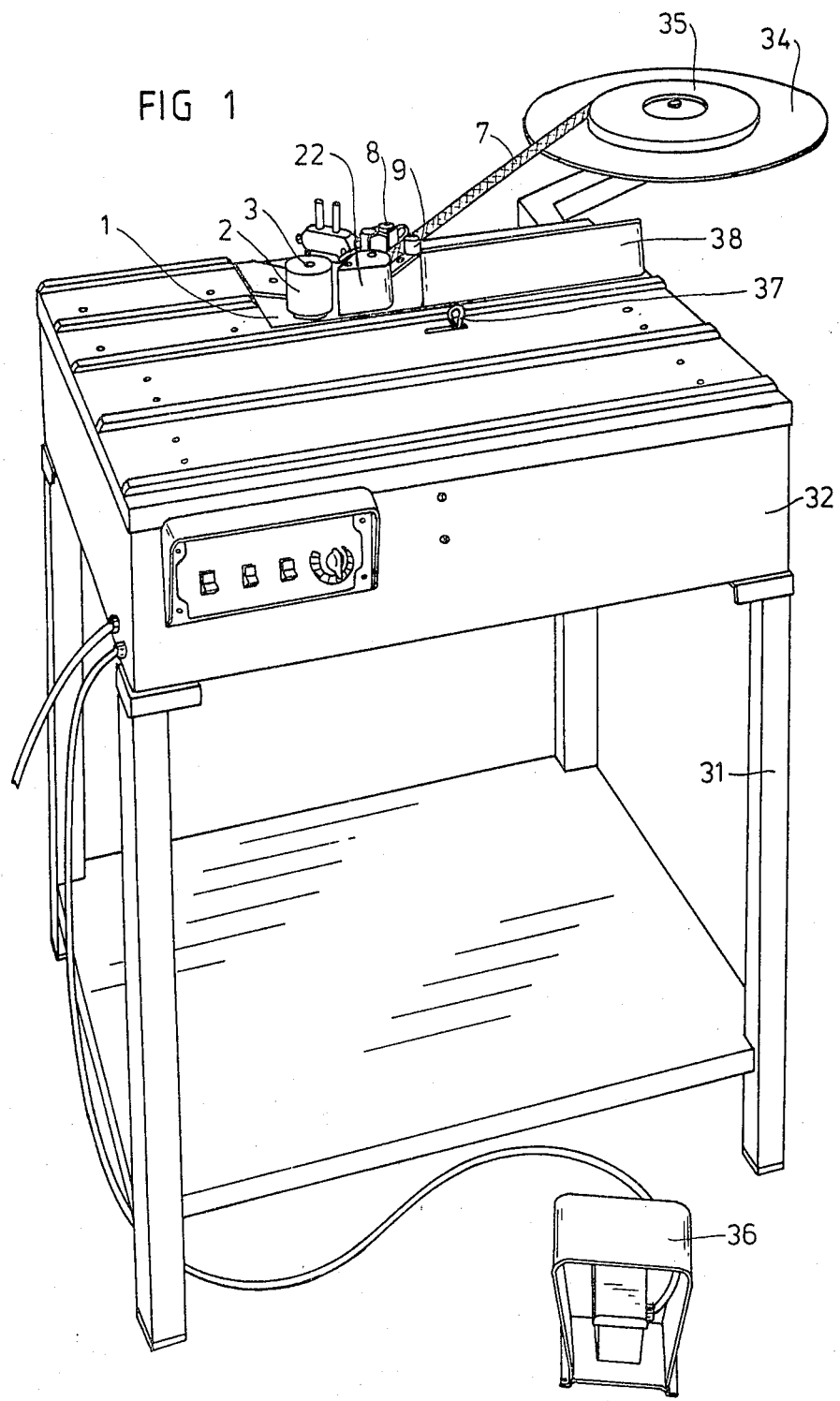
FIG. 1 is an isometric view of an edge banding machine according to the invention.
Figure 2:
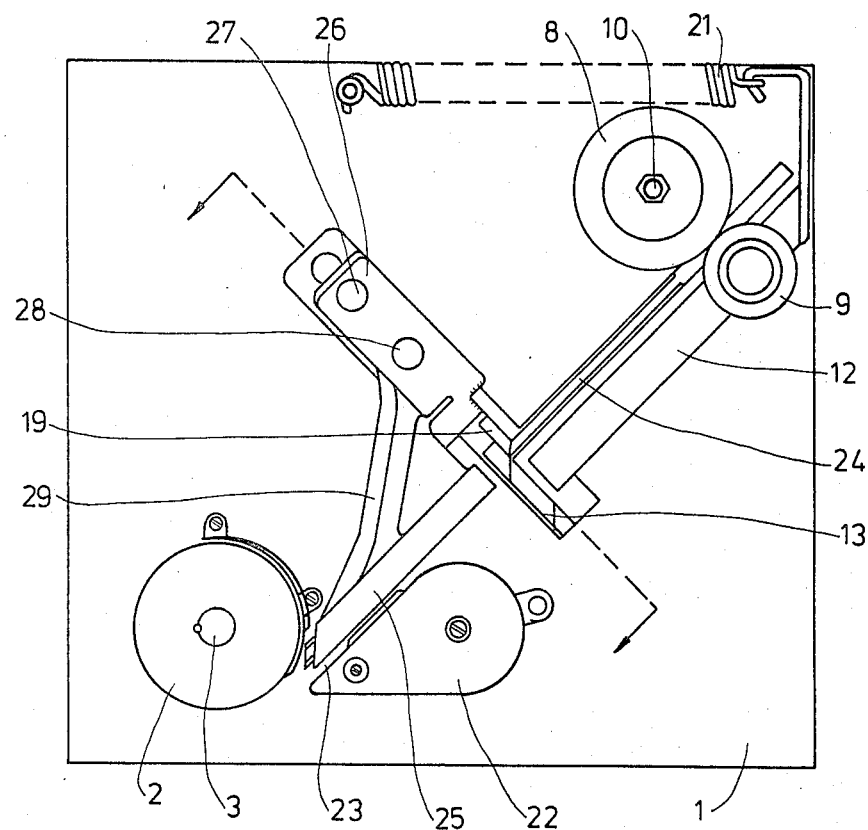
FIG. 2 is a plan view from above of the application and cutter assembly of the edge banding machine.
Figure 3:
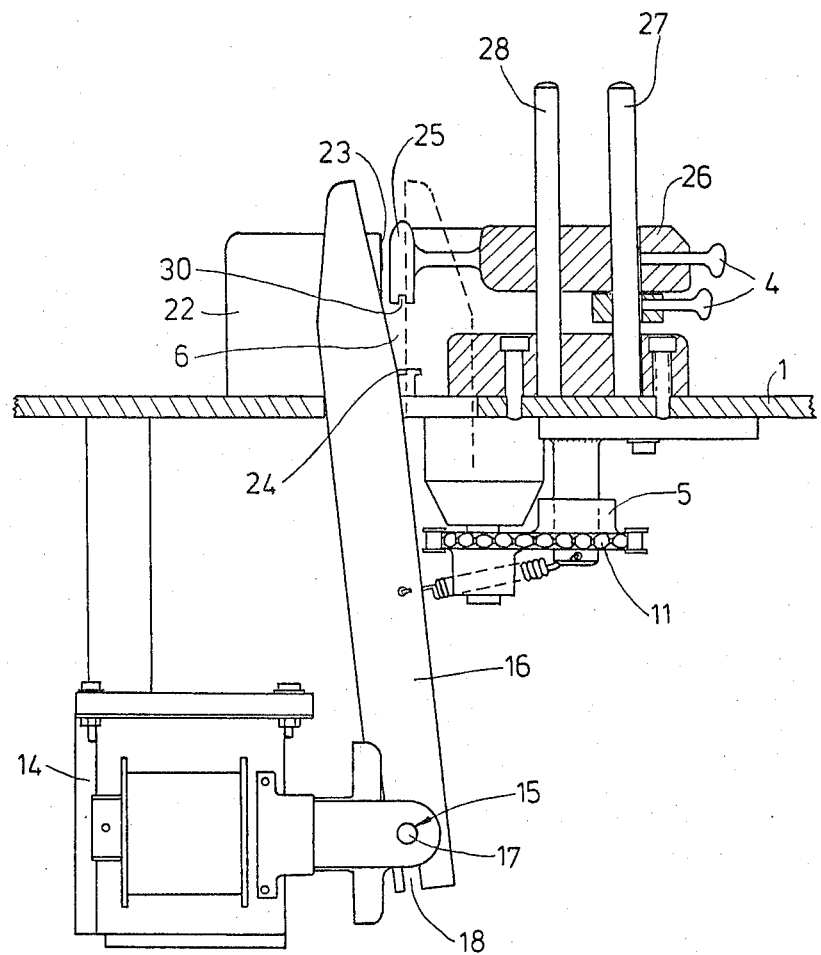
FIG. 3 is a sectional view along A—A of FIG. 2.

In its preferred form the apparatus of the present invention comprises a horizontal rectangular base plate 1, typically a cast aluminium plate 23 cm by 25 cm. At one corner of the plate there is mounted an applying means, typically in the form of an application roller 2 mounted on spindle 3 extending vertically from the plate. The roller is typically mounted on roller bearings (not shown), the spindle extending underneath the plate and being provided with a sprocket wheel 5 so that the roller can be chain driven. Extending approximately diagonally across the rectangular plate, and tangentially to the application roller, is a tape path 6, which is a straight guide path for tape 7 which is to be adhered to the edge of a board (not shown). At the corner of the plate opposite the application roller is a pair of drive rollers 8 and 9 which form a nip between which the tape must pass. One of the rollers 8, is mounted on a shaft 10 which extends below the base plate, the lower portion of the shaft having mounted thereon an electric motor (not shown) for driving the drive rollers. Also connected to the shaft is a sprocket wheel (not shown) for driving a chain 11 for driving the application roller as indicated above.

The other drive roller 9 is freely rotatable, being driven by friction contact as the tape is fed through the nip between it and the first driven roller 8. This roller (9) is mounted on a lever 12 pivoted to the plate about a vertical axis. The lever extends parallel to the tape path, and the far end of the lever is attached to a knife blade 13 for shearing the tape to cut it to length.

Actuation of the lever is effected by means of a solenoid 14, typically mounted under the base plate and pivotably connected at 15 to a substantially vertical lever 16, the upper portion of which, extending above the base plate, comprises the shearing blade.

The connection between the solenoid and the knife lever typically comprises a pin 17 across the end of the rod which is actuated by the solenoid, and a slot 18 within the end of the knife lever. This slot fits over the pin so that as the solenoid rod moves back and forth it can slide within the slot as it pulls the knife blade for its cutting stroke.

The blade co-acts with a fixed blade 19 mounted on the base plate. Normally the shearing blade is held open so that the tape can pass along the tape path between it and the fixed blade, but when the solenoid is actuated the movable blade moves across the tape path to meet the fixed blade and cut the tape, simultaneously moving the lever 12 which the second drive roller is mounted on, so that the roller moves away from the driven drive roller. Thus the tape is no longer gripped in the nip between the two rollers, and it is therefore no longer driven along the tape path.

The lever 12 upon which the second guide roller is mounted may be biased by spring 21 towards the driving position, so that while the solenoid is not activated, the spring holds the knife blade open and urges the driving rollers together to drive the tape that is between them.

Positioned on the plate adjacent the tape path is a hot air manifold 22, having a nozzle comprised of an open side 23 of the manifold immediately adjacent the tape path. The nozzle is in the form of a rectangular opening in the side of the manifold, slightly raised from the plate to bring the nozzle into close proximity with the path of the tape. The downstream side of the raised nozzle is, however, rebated by about a millimeter to allow hot gas to travel along the direction of movement of the tape to continue to heat the surface of the tape downstream of the nozzle.

The lower edge of the tape guided along the tape path passes along one or more slotted guides 24 to help keep the tape within the straight line path across the apparatus. Also, extending down the tape path between the shearing blades and the application roller is an upper edge guide 25 comprising a flat bar with a slot 30 in its lower edge within which the upper edge of the tape can fit. This bar is mounted on a mounting block 26 which is in turn mounted on a pair of vertical guide bars 27 and 28 along which the block can slide up or down. The block is held in position on the guide bars by means of thumb screws 4. By temporarily undoing the thumb screws the block can be slid up or down to allow the upper edge guide member 25 to be moved up or down to accommodate different widths of tape within the tape path between the lower and upper edge guides.

The flat side of the guide member adjacent the nozzle covers that portion of the nozzle which is not normally covered by the tape. Thus, the rectangular nozzle can be sized so as to blow air across the full width of the widest tape which it is contemplated will be fed through the device, yet will not allow much hot gas to escape past the tape if a narrower tape is being used, as the upper portion of the nozzle is then blocked off by the guide bar.

The mounting block 26 and the guide bar 25 are typically formed together as a single aluminium casting. The guide rods 27 and 28 are typically positioned along the cutting plane which is the plane within which the co-acting surfaces of the fixed and moving knife blades lie. Thus the lower edge of the tape is guided along substantially the whole of the distance between the pair of drive rollers and the application roller, while the upper edge of the tape is guided for substantially the whole distance between the knife blades and the application roller. The tape is thus held steady as the hot gas is blown against its surface. The tape then passes around the application roller with the heated side of the tape facing away from the roller and if, the edge of a board is held against the application roller, the rotation of the roller causes the board to move along it, and the heated surface of the tape is simultaneously pressed onto it to adhere to it.

The plate is provided with an edge sensing means 37 to sense the end of the edge of the board, so that as the edge of the board passes the sensing means the solenoid is actuated to activate the cutter blade and to disengage the drive rollers as described above. The tape is thus no longer being driven past the knife position, but the severed end of the tape continues to pass between the guides downstream of the knife blade, past the hot gas nozzle to the application roller and the board. The trailing edge of the tape will coincide exactly with the trailing end of the board.

The hot gas nozzle is thus no longer covered by the tape, and the hot gas will be blown across the tape path into an empty space above the base plate between the application roller and the vertical rods upon which the mounting block is mounted. Between the application roller and this empty space there is a baffle plate 29 to ensure that none of the gas heats the roller. However, the position of the nozzle is such that none of the gas is blown directly onto the baffle plate, but instead all of the gas is directed into the empty space. Insulating material may be placed around the guide blocks and guide rods and around the baffle plate to help ensure that no heat from the heated gas affects any part of the apparatus. If desired, there may be positioned, immediately above the space into which the hot air is exhausted, a fan or other suction device to direct the gas away from the apparatus. Thus the application roller remains unheated, and there is no tendency for the tape to adhere to the roller.

The hot gas being fed into the manifold is typically fed along a tubular duct (not shown) which has a heating element (not shown) mounted within it. The heating element typically comprises a former in the form of a pair of mica or other insulating stiffeners arranged so that the construction has a cross-shaped cross-section. Heating wire is wound around the former. Air or other gas being directed past the element can thus be heated by the heating wire. If desired, the air inlet to the heater may be directly above the empty space into which the hot air is exhausted, so that the heat is not simply directed away but can be recycled. The element may be controlled by means of a thermostat to ensure that the air entering the manifold and passing out through the nozzle remains within an optimum temperature range.

It is convenient to mount the apparatus of the present invention on a support such as that shown as 31 in FIG. 1. To ensure that a person using the apparatus is protected from moving parts of the apparatus, a casing 32 is placed around these. The casing also serves as a convenient support for a control box 33 which houses the electrical controls, and a tape support disc 34 on which the supply reel of tape 35 is mounted. In order to leave the hands of an operator free to manipulate a board and apparatus, a foot control switch 36 is provided to control the tape cutting mechanism. An upright member 38 is provided to assist an operator to correctly align a guide and board to which a veneer is being pressed with respect to the application roller.

Many modifications to the above may be made without departing from the scope of the present invention as broadly defined. The configuration of the base plate may be varied and more than one base plate may be used but it is important, however the various components are arranged, that the hot-air nozzle not be pointed or directed towards the applying means.

I claim:

1. An edge banding machine comprising a heating means for blowing heated gas onto one surface of a tape to heat the same, a feeding means for feeding the tape past the heating means wherein the direction of travel of the tape is from upstream to downstream, an applying means immediately downstream of the heating means for pressing heated tape onto a surface to which it is to be adhered, and a severing means upstream of the heating means for cutting the tape to the length of the surface to which it is to be adhered, the heating means having a fixed nozzle for directing the gas onto the tape, the downstream edge of said nozzle being rebated to allow some of the gas to travel along the direction of movement of the tape, wherein the machine further comprises a guiding means for supporting the tape by its edges and guiding the tape directly in front of the nozzle, said guiding means being vertically adjustable to accommodate tapes of different widths and comprising a movable barrier which extends across part of the nozzle so that, whenever a tape is fed past the nozzle, the guiding means blocks off that portion of the nozzle which is not covered by the tape, the construction and arrangement being such that, in use, the heated gas issuing through the nozzle is directed towards an empty space when no tape is presented for heating, and when a tape is presented for heating it is interposed into the path of the heated gas, whereby in neither case does the heated gas impinge on moving parts of the machine.

2. An edge banding machine as claimed in claim 1 wherein the parts of the machine around said empty space have a heat insulating material between them and the empty space to prevent heat from the heated gas from affecting the machine.

3. An edge banding machine as claimed in claim 1 wherein the heating means comprises a housing and the nozzle comprises a substantially rectangular opening in the housing.

4. An edge banding machine as claimed in claim 1 wherein the applying means comprises a roller.

5. An edge banding machine as claimed in claim 4 wherein a baffle is situated between the roller and the space into which the heated gas blows whenever a tape is not directly in front of the nozzle.

6. An edge banding machine as claimed in claim 1 wherein a gas suction means is provided in the region of said empty space to conduct heated gas entering the space away from the machine.

7. An edge banding machine as claimed in claim 1 wherein each of said heating means, feeding means and applying means is mounted on at least one base plate.

8. An edge banding machine as claimed in claim 7 wherein the feeding means comprises a pair of rollers, the axis of each roller being perpendicular to the plane of the plate, one of said rollers being drivable but adapted to stop whenever said severing means is actuated.

9. An edge banding machine as claimed in claim 7 wherein the applying means comprises a roller.

10. An edge banding machine as claimed in claim 7 wherein the base plate further comprises supporting means to which said guide means for guiding the tape past the heating means can be adjustably mounted.

11. An edge banding machine as claimed in claim 10 wherein the supporting means comprises a plurality of rods mounted perpendicular to the plate, the guiding means being slideable along said rods.

* * * * *